July 9, 1929. M. P. SMITH Re. 17,370
FRUIT EVAPORATOR
Original Filed Feb. 25, 1924
FIG. 1
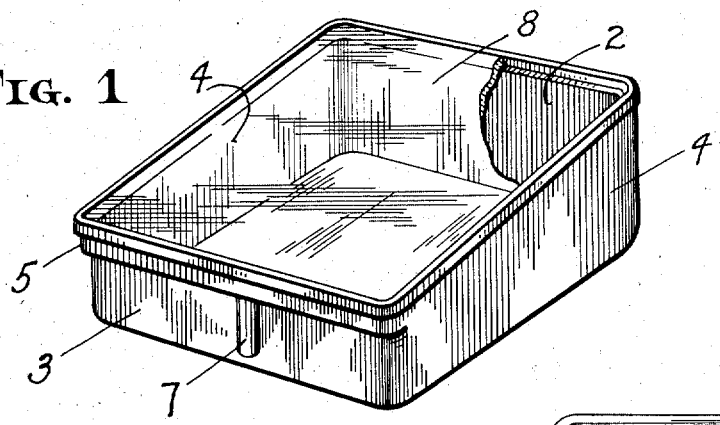
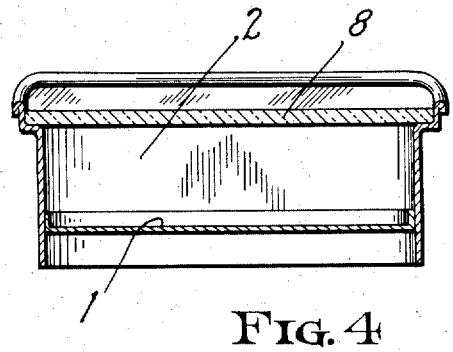
FIG. 4
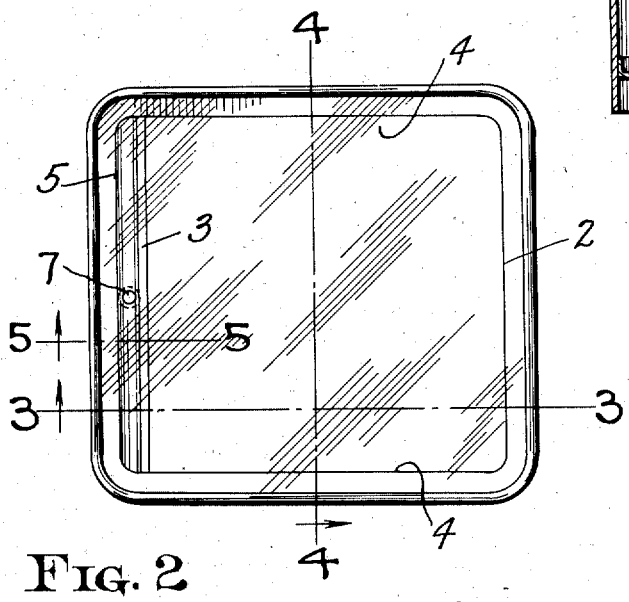
FIG. 2
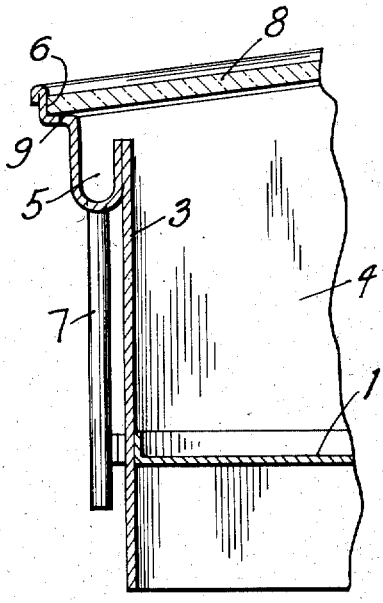
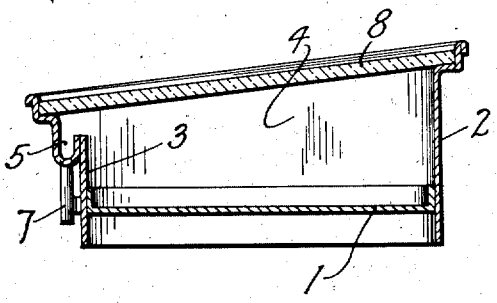
FIG. 3
FIG. 5
INVENTOR
MARY P. SMITH.
BY
Rolland S. Crotts
ATTORNEY Reissued July 9, 1929. Re. 17,370

UNITED STATES PATENT OFFICE.

MARY PARKER SMITH, OF DENVER, COLORADO.

FRUIT EVAPORATOR.

Original No. 1,538,957, dated May 26, 1925, Serial No. 694,870, filed February 25, 1924. Application for reissue filed May 26, 1927. Serial No. 194,502.

This invention relates to evaporators for fruits.

In many parts of the country, where fruit is available, it is customary for housewives to prepare preserves, jellies and similar food products. In places where there is sufficient sunshine the fruit is exposed to the sun's rays whereby the liquid contained therein is evaporated to such an extent that the preserves are given the proper consistency.

In the ordinary method of evaporation, the time required often runs into days, three days being frequently necessary.

With my improved evaporator I have been able to obtain the required evaporation in three hours and to a get a better product than has heretofore been obtained in three days.

My invention resides in the peculiar construction of my evaporator, which, briefly described, consists of a box of substantially rectangular construction and formed of any suitable material such as porcelain, pyrex, enameled metal or aluminum. The box is higher on one end than the other and the sides connecting the ends are inclined. The upper edge of both sides and ends have a rabbet along the inside for the reception of a glass cover. Along the inner surface of the lower end is a gutter which extends the entire width of the box and serves to receive the water that condenses on the inner surface of the glass cover.

My invention can be best described and will be most readily understood when reference is had to the accompanying drawing in which the preferred embodiment thereof is shown, and in which:

Figure 1 shows a perspective view of the evaporator;

Figure 2 is a top plan view thereof;

Figure 3 is a section taken on the line 3—3 of Figure 2;

Figure 4 is a section taken on the line 4—4 of Figure 2; and

Figure 5 is a section on the line 5—5 of Figure 2, showing the parts on an enlarged scale.

My improved evaporator may be made of any suitable material, as noted above, but has been shown as constructed from sheet aluminum. The evaporator is preferably square or rectangular with rounded corners, although it may be made round or any other shape and has a bottom 1, end walls 2 and 3, and sides 4.

The bottom is secured to the sides and ends a short distance above the lower edge of the latter so that it will be spaced a short distance from any flat surface upon which the evaporator may be placed. The end 3 has secured to the outside thereof near its upper edge a gutter 5 whose upper edge is offset as shown at 6 in Figure 5. The gutter has an opening in its bottom and a short tube 7 is secured to the opening.

The end 2, which is opposite end 3, is higher and is joined to the latter by sides 4. The upper edge of the sides and the end 2 are provided with an offset similar to that indicated by 6 in Figure 5.

A glass plate 8 of the proper size is formed to fit snugly within vertical edges of the offset portions and to rest upon the shoulder 9. The end 3 is of such height that it does not quite reach the underside of the glass (Figure 3). This permits water that condenses on the under side of the glass to flow downwardly and into the gutter, from which it escapes through the tube 7.

When my device is to be used for the preparation of preserves, for example strawberry preserves, the berries and the sugar are subjected to heat and brought to a boil. They are then placed within my evaporator and the glass cover put in place. The evaporator is then placed in the sun so that the sun's rays strike the glass. The action of the sun's rays causes the liquid to evaporate quite rapidly.

The evaporator and contents are left exposed to the sun until the preserves reach the proper consistency. The vapors that arise from the preserves condense on the inside of the glass and flow downward and out in the manner explained.

The rapid action of my evaporator is believed to be due to the fact that the glass conserves the heat and to the additional fact that the vapors are condensed and carried away.

It is evident that if the preserves were placed in a container and covered by a glass and no provision made for removing the moisture, the air would soon become saturated and the evaporation cease.

It is very important therefore that the glass cover shall be inclined and that the box shall be provided with a gutter for receiving the condensed moisture, as by this means it is possible to maintain the air dry and the evaporation at a maximum.

Having now described my invention, what I claim as new is:

1. A device of the character described including a pan covered by an inclined glass top, said pan having a side wall thereof approximately shorter than the opposite side wall thereof and terminating at a point below the glass top providing a space therebetween, said glass top extending through said space and a gutter secured to the shorter side wall exteriorly thereof and communicating with the interior through the space for receiving water of condensation from the glass top.

2. A fruit preservator comprising a box-like casing having an inclined glass top, a gutter applied exteriorly to the top portion of the shorter upright side wall of the structure, the lower portion of the glass top projecting laterally beyond the said wall and overhanging the gutter, the said wall being shortened at the top to leave a space between its upper edge and the glass cover, said space establishing communication between the casing chamber and the gutter, the outer wall of the gutter extending upwardly above the inner wall thereof and forming a support for the adjacent overhanging part of the glass top, and forming therewith a tight joint, the gutter having an outlet for water of evaporation which passes thereto from the under surface of the glass.

3. A fruit preservator comprising a box-like casing, including an inclined glass top, a gutter applied to the top portion of the upright side wall of the casing, the lower portion of the glass top projecting laterally beyond the inner surface of said wall and overhanging the gutter, the inner edge of the gutter being spaced from the glass cover, the outer wall of the gutter merging with the wall of the casing and forming a support for the adjacent overhanging part of the glass top, the gutter having an outlet for water of evaporation which passes thereto from the under surface of the top.

4. A sun cooker comprising a casing adapted to hold liquids and including a side wall and a glass top, the top portion of the side wall having a gutter provided with an outlet for water of evaporation which passes thereto from the under surface of the top, the lower portion of the top projecting laterally beyond the inner surface of said wall and overhanging the gutter, the inner edge of the gutter being spaced from the top, the outer wall of the gutter merging with the wall of the casing and forming a support for the adjacent overhanging part of the top.

5. A solar cooker comprising a receptacle having the sides and bottom thereof permanently closed and adapted to receive and retain fluid material, a transparent cover for the receptacle, permitting solar heat rays to pass into the receptacle, said cover receiving and condensing the vapors arising from the fluid material, and means for carrying off the products of condensation.

6. An evaporator of the character described comprising a receptacle having a side wall, a transparent cover for said receptacle, and a gutter disposed along said side wall in relatively close proximity with the cover for receiving products of condensation from said cover.

7. An evaporator of the character described comprising a receptacle having a side wall, a transparent cover for said receptacle, said receptacle having an opening between the side wall and the cover, and a gutter disposed along the side wall externally thereof and in relatively close proximity with the cover for receiving products of condensation from said cover.

In testimony whereof, I affix my signature.

MARY PARKER SMITH.